(12) United States Patent
Lee et al.

(10) Patent No.: US 9,840,865 B2
(45) Date of Patent: Dec. 12, 2017

(54) DEVICE, SYSTEM AND METHOD FOR REDUCING PHYSICAL IMPACTS

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 274 days.

(21) Appl. No.: 14/812,117

(22) Filed: Jul. 29, 2015

(65) Prior Publication Data

US 2017/0002593 A1    Jan. 5, 2017

(30) Foreign Application Priority Data

Jul. 1, 2015  (CN) .......................... 2015 1 0379809

(51) Int. Cl.
| | |
|---|---|
| G05B 13/00 | (2006.01) |
| G05B 15/00 | (2006.01) |
| E05F 15/71 | (2015.01) |
| G01S 17/93 | (2006.01) |
| E05F 5/02 | (2006.01) |

(52) U.S. Cl.
CPC .............. *E05F 15/71* (2015.01); *G01S 17/93* (2013.01); *E05F 5/02* (2013.01); *E05Y 2400/36* (2013.01); *E05Y 2400/44* (2013.01); *E05Y 2400/53* (2013.01); *E05Y 2400/532* (2013.01); *E05Y 2400/56* (2013.01); *E05Y 2400/86* (2013.01); *E05Y 2900/132* (2013.01); *E05Y 2900/148* (2013.01)

(58) Field of Classification Search
CPC .. E05F 5/02; E05F 15/71; G01S 17/93; E05Y 2400/53; E05Y 2400/56; E05Y 2900/132; E05Y 2900/148
See application file for complete search history.

(56) References Cited

U.S. PATENT DOCUMENTS

| | | | |
|---|---|---|---|
| 4,483,044 A * | 11/1984 | Johnston ................... | E05F 3/02 16/341 |
| 4,771,854 A * | 9/1988 | Syrowik ................. | B60R 22/34 180/268 |
| 7,164,117 B2 * | 1/2007 | Breed ............... | B60R 21/01516 250/208.1 |
| 8,016,367 B2 * | 9/2011 | Hirata ...................... | B60K 6/48 303/138 |
| 2007/0228822 A1 * | 10/2007 | Hirata ...................... | B60K 6/48 303/151 |
| 2008/0189000 A1 * | 8/2008 | Duong ...................... | B60T 7/22 701/20 |

(Continued)

*Primary Examiner* — Mark Connolly
(74) *Attorney, Agent, or Firm* — Steven Reiss

(57) ABSTRACT

An impact reducing device applied to a door or window which is closing includes a depth-sensing camera, an impact reducing system, and an impact reducing unit. The depth-sensing camera captures images of a target constantly, and obtains Z depth information of the target. The impact reducing system determines whether the target is going to close according to the Z depth information and controls the impact reducing unit to provide a resistance such as a strong jet of air when the target is going to close, to reduce violent impacts.

15 Claims, 7 Drawing Sheets

(56) References Cited

U.S. PATENT DOCUMENTS

| | | | | |
|---|---|---|---|---|
| 2009/0260289 A1* | 10/2009 | Carpenter | ................ | E05F 5/00 49/26 |
| 2012/0132475 A1* | 5/2012 | Kim | .................... | B60R 19/205 180/274 |
| 2013/0227818 A1* | 9/2013 | Zippert | .................. | B60R 21/38 16/366 |

* cited by examiner

DEVICE, SYSTEM AND METHOD FOR REDUCING PHYSICAL IMPACTS

CROSS-REFERENCE TO RELATED APPLICATIONS

This application claims priority to Chinese Patent Application No. 201510379809.4 filed on Jul. 1, 2015, the contents of which are incorporated by reference herein.

FIELD

The subject matter herein generally relates to Internet of things (IoT). More particularly, the present application relates to a smart device, system, and method for reducing physical impacts generated by doors and windows.

BACKGROUND

Doors or windows may slam shut, due to an external force such as wind. In this situation, an alarming noise can be generated, a user may be crushed, such as in FIG. 1, or windows or doors may be shattered.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
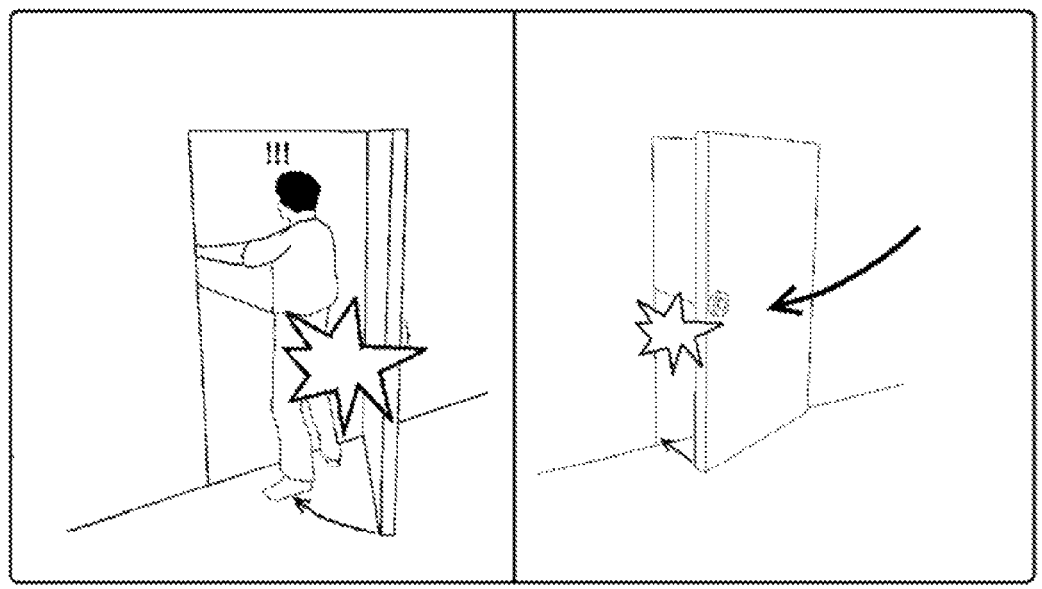
FIG. 1 shows impacts and a noise generated due to doors closing suddenly.

It will be appreciated that for simplicity and clarity of illustration, where appropriate, reference numerals have been repeated among the different figures to indicate corresponding or analogous elements. In addition, numerous specific details are given in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

Figure 2:
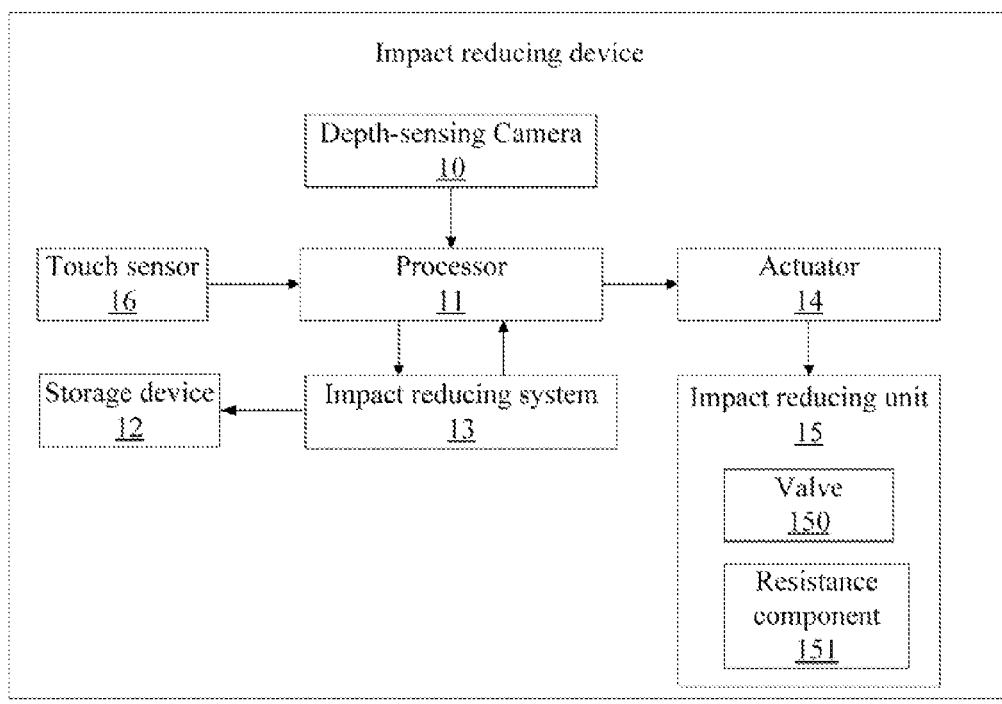
FIG. 2 is a block diagram of one embodiment of hardware architecture of an impact reducing device.

FIG. 2 is a block diagram of one embodiment of hardware architecture of an impact reducing device. In at least one embodiment, the impact reducing device 1 includes components such as a depth-sensing camera 10, at least one processor 11, a storage device 12, an impact reducing system 13, an actuator 14, an impact reducing unit 15, and a touch sensor 16. The components 10-16 are connect to each other using data buses.

The depth-sensing camera 10 may be a time-of-flight camera (TOF camera), which creates distance data with help of the time-of-flight (TOF) principle. A scene is illuminated by short light pulses and the camera measures the time taken for the reflected light to come back to the camera. This time is directly proportional to the distance. The camera therefore provides a range value for each pixel.

The at least one processor 11 can be central processing unit (CPU), a microprocessor, or other data processor chip.

The storage device 12 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 12 can also be an external storage system, such as a hard disk, a storage card, or a data storage medium.

The impact reducing system 13 includes computerized codes that, when executed by the at least one processor 11, can determine that a target, such as a door or a window, is going to close. The impact reducing system 13 can provide a resistance when the target is going to close rapidly, to reduce the closing impact. The computerized codes of the impact reducing system 13 can be stored in the storage device 12.

The actuator 14 actuates the impact reducing unit 15 to open a valve 150 of the impact reducing unit 15, and enable the resistance component 151 to provide a resistance against the target. The resistance component 151 can be any component which provides a counter-force or damping effect. In at least one embodiment, the resistance component 151 can be an airstream injection component, which can output a strong airstream when the valve 150 opens. In other embodiment, the resistance component 151 can be a flexible component, which can pop out when the valve 150 opens. One skilled in the art understands that the above are only examples of components, which are not limited thereto.

The touch sensor 16 detects a touch of a user, to determine whether the closing of the target is intended by the user. The touch sensor can be installed on the target. When the touch sensor 16 detects a touch, it can be determined that the closing of the target is intended by a user. When the touch sensor 16 does not detect a touch, it can be determined that the closing of the target is not intended by a user.

The target as mentioned above may include any swinging or opening and closing component which can be closed due to an external force, such as wind. For example, the target can be a door, a window, or the like.

Figure 3A:
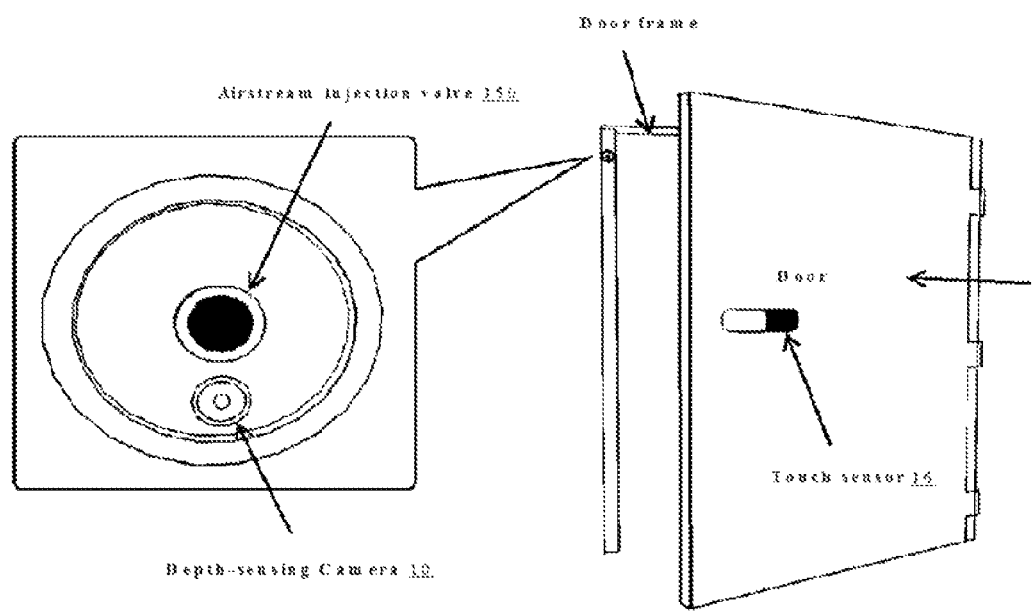
FIG. 3A and FIG. 3B are embodiments of application of the impact reducing device.
Figure 3B:
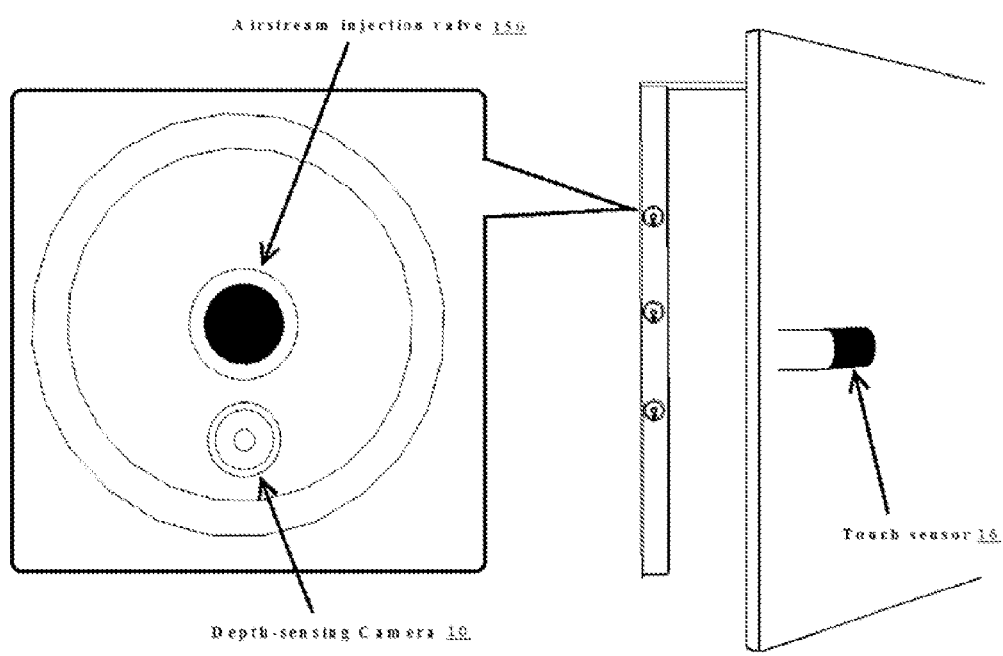

Referring to FIG. 3A, the depth-sensing camera 10, the actuator 14 (not shown), and the impact reducing unit 15 can be installed on a suitable location of a door or window frame, and the touch sensor 16 is installed on a handle of the door or window. In other embodiment, referring to FIG. 3B, there may be more than one of the depth-sensing camera 10, the actuator 14, and the impact reducing units 15 as a group, the group being installed on a door or window frame.

In at least one embodiment, the impact reducing system 13, the at least one processor 11, and the storage device 12 are installed in an electronic device, such as, but is not limited to, a desktop computer, a notebook computer, and a handheld computing device, a cellular phone or a portable media player. Only the depth-sensing camera 10, the actuator 14, and the impact reducing unit 15 are installed on the target. The electronic device and the target can communicate with each other via a communication module such as a BLUETOOTH module, a WIFI module, and so on.

In other embodiment, all of the depth-sensing camera 10, the at least one processor 11, the storage device 12, the impact reducing system 13, the actuator 14, the impact reducing unit 15, and the touch sensor 16 are installed on the target.

In the present embodiment, the depth-sensing camera 10 can capture images of a target, (a door, hereinafter) constantly, and obtain three-dimensional image information and Z depth information of the target. The Z depth information of the target is a distance between the target and the depth-sensing camera 10 (namely, a door frame on which the depth-sensing camera 10 is installed). When the door is closed, the Z depth information=0. When Z depth information>0, the door is open. Then, the impact reducing system 13 begins to record vary of the Z depth information of the door, and monitors a movement of the door. The impact reducing system 13 can determine that the door is going to close. For example, when the Z depth information of the door indicates a decrease as time passes, the door is going to close. In addition, the impact reducing system 13 further computes a movement speed of the closing door. When the distance between the door and the door frame is less than a predetermined distance, or the movement speed of the closing door is greater than a predetermined speed, the actuator 14 actuates the impact reducing unit 15 to open a valve 150 of the impact reducing unit 15, and enable the resistance component 151 to work, by for example injecting a strong and sudden airstream, to provide resistance to the closing door.

FIG. 2 illustrates only one example of the electronic device 1, other examples can include more or fewer components than as illustrated, or have a different configuration of the various components in other embodiments.

Figure 4:
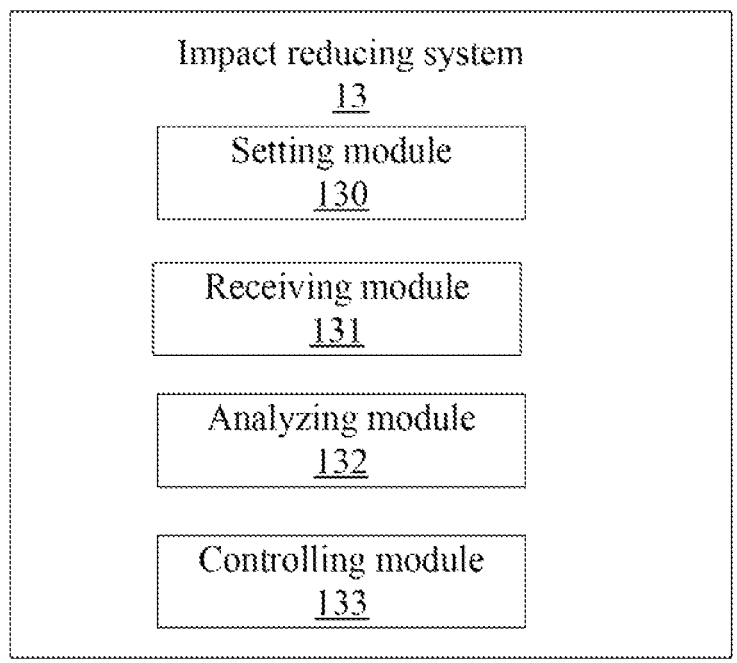
FIG. 4 is a block diagram of one embodiment of function modules of an impact reducing system.

FIG. 4 is a block diagram of one embodiment of function modules of an impact reducing system. In at least one embodiment, the function modules of the impact reducing system 13 can include a setting module 130, a receiving module 131, an analyzing module 132, and a controlling module 133.

Figure 6:
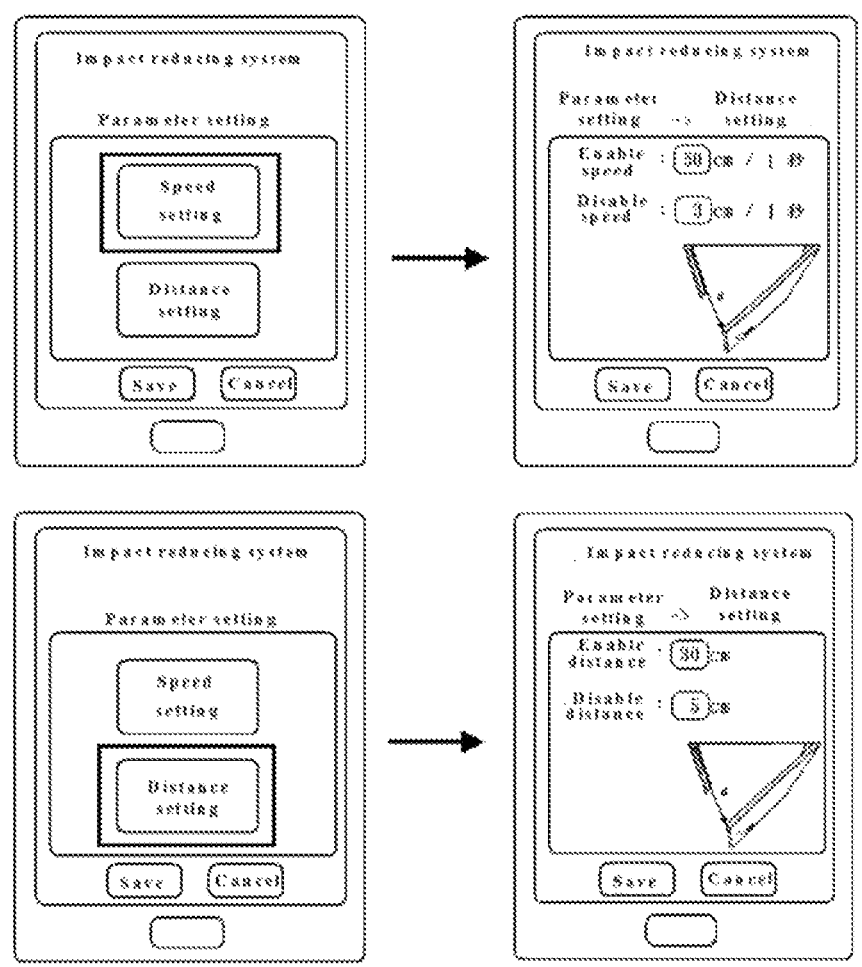
FIG. 6 illustrates examples of parameters which can be set in the impact reducing device.

The setting module 130 can provide a parameter setting interface to receive parameters set by a user. In at least one embodiment, the parameters can include speed and distance parameters in relation to a closing door, as illustrated in FIG. 6. The speed parameters include an enable speed and a disable speed; and the distance parameters include an enable distance and a disable distance. The enable speed and the enable distance are the conditions for actuation of the impact reducing unit 15. The disable speed and the disable distance are the conditions for of stopping the impact reducing unit 15. For example, the enable speed can be 50 cm per second and the enable distance can be 30 cm. That is, when the movement speed of the door is greater than 50 cm per second or the distance between the door and the door frame is less than 30 cm, the valve 151 opens, and the resistance component 151 works. The disable speed can be 3 cm per second and the disable distance can be 5 cm. That is, when the movement speed of the door is less than 3 cm per second and the distance between the door and the door frame is less than 5 cm, the resistance component 151 stops working and the valve 151 closes.

In other embodiment, although a distance between the door and the door frame may be within the enable distance, but the door is not moving, the actuator 14 does not actuate the impact reducing unit 15.

Additionally, the setting module 130 also can be used to set resistance or counter-force levels according to movement speeds of the door. For example, when the movement speed of the door is greater than S1 and less than S2, a resistance generated by the impact reducing unit 15 can be level 1; when the movement speed of the door is greater than S2 and less than S3, a resistance generated by the impact reducing unit 15 can be level 2; and when the movement speed of the door is greater than S3 and less than S4, a resistance generated by the impact reducing unit 15 can be level 3; where S4>S3>S2>S1.

The receiving module 131 can obtain three-dimensional image information and Z depth information of the target from the depth-sensing camera 10. As mentioned above, the depth-sensing camera 10 captures images of the door constantly, and obtains three-dimensional image information and Z depth information of the door.

The analyzing module 132 can analyze whether the Z depth information of the door varies, and analyze whether the door is going to close. It may be understood that, the Z depth information of the target is a distance between the door and a door frame on which the depth-sensing camera 10 is installed. When the door is closed to the door frame, the Z depth information=0. When Z depth information>0, it is submitted that, the door is open to the door frame. When the Z depth information of the door is decreased with pass of time, it is submitted that the door is going to close.

The controlling module 133, according to the parameters, can control the actuator 14 to actuate the impact reducing unit 15, namely to open the valve 150 of the impact reducing unit 15, and enable the resistance component 151 to work.

Figure 5:
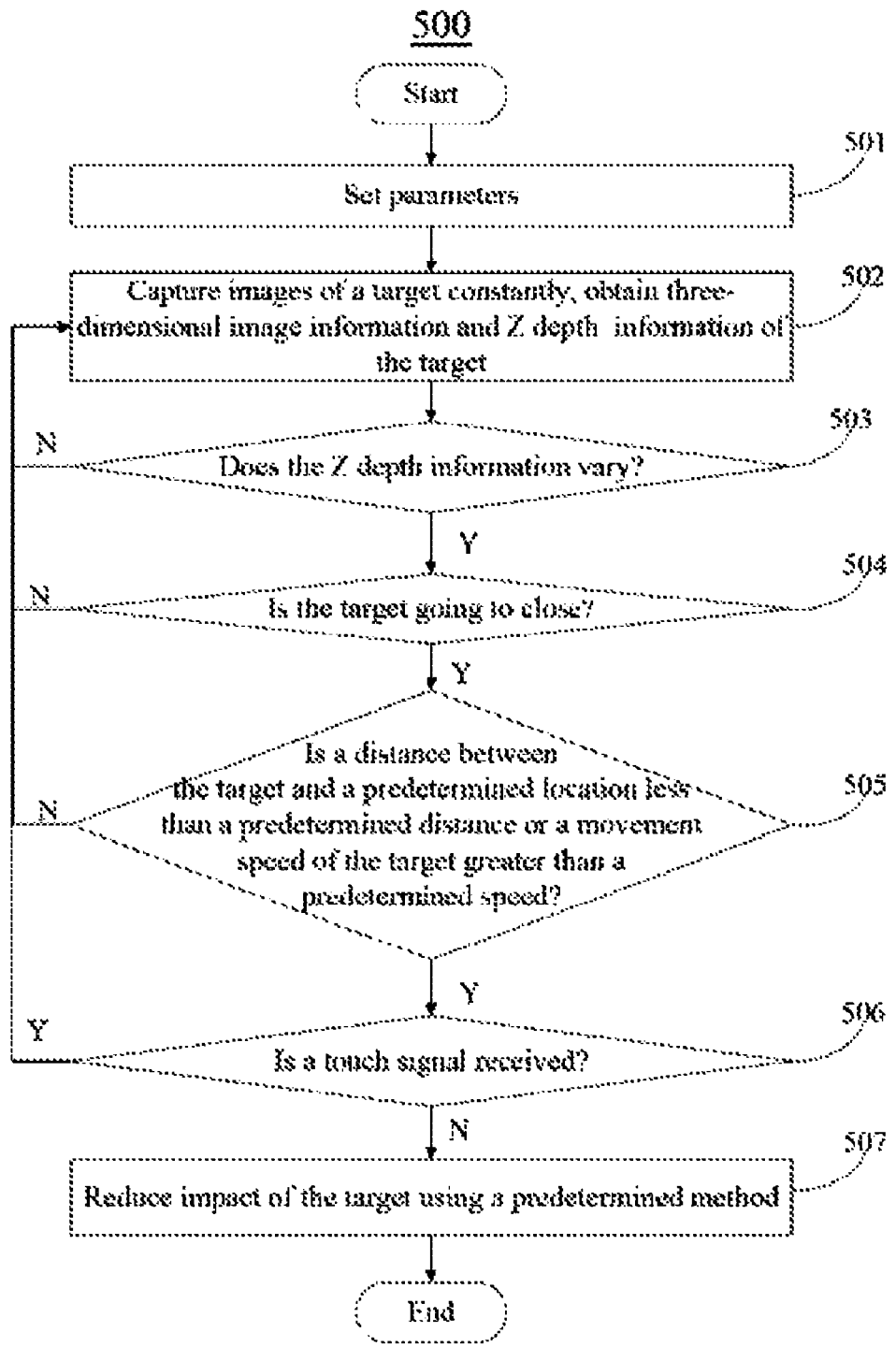
FIG. 5 is a flowchart of one embodiment of an impact reducing method.

FIG. 5 is a flowchart of one embodiment of an impact reducing method.

Referring to FIG. 5, a flowchart is presented in accordance with an example embodiment illustrated. The example method 500 is provided by way of example, as there are a variety of ways to carry out the method. The method 500 described below can be carried out using the configurations illustrated in FIGS. 2 and 4, for example, and various elements of these figures are referenced in explaining example method 500. Each block shown in FIG. 5 represents one or more processes, methods, or subroutines carried out in the exemplary method 500. Furthermore, the illustrated order of blocks is by example only and the order of the blocks can change. Additional blocks may be added or fewer blocks may be utilized, without departing from this disclosure. The exemplary method 500 can begin at block 501.

At block 501, a setting module provides a parameter setting interface to receive parameters set by a user. In at least one embodiment, the parameters can include speed and distance parameters in relation to a closing door, as illustrated in FIG. 6. The speed parameters include an enable speed and a disable speed; and the distance parameters include an enable distance and a disable distance. The enable speed and the enable distance are the conditions for actuation of the impact reducing unit 15. The disable speed and the disable distance are the conditions for of stopping the impact reducing unit 15. For example, the enable speed can be 50 cm per second and the enable distance can be 30 cm. That is, when the movement speed of the door is greater than 50 cm per second or the distance between the door and the door frame is less than 30 cm, the valve 151 opens, and the resistance component 151 works. The disable speed can be 3 cm per second and the disable distance can be 5 cm. That is, when the movement speed of the door is less than 3 cm per second and the distance between the door and the door frame is less than 5 cm, the resistance component 151 stops working and the valve 151 closes.

Additionally, the parameters further include resistance or counter-force levels corresponding to movement speeds of the target. For example, when the movement speed of the door is greater than S1 and less than S2, a resistance generated by the impact reducing unit 15 can be level 1; when the movement speed of the door is greater than S2 and less than S3, a resistance generated by the impact reducing unit 15 can be level 2; and when the movement speed of the door is greater than S3 and less than S4, a resistance generated by the impact reducing unit 15 can be level 3; where S4>S3>S2>S1.

At block 502, a receiving module obtains three-dimensional image information and Z depth information of the target from a depth-sensing camera. The depth-sensing camera 10 can captures images of the target constantly, and obtains three-dimensional image information and Z depth information of the target.

At block 503, an analyzing module analyzes whether the Z depth information of the target varies. The Z depth information of the target is a distance between the door and a door frame on which the depth-sensing camera 10 is installed. When the door is closed to the door frame, the Z depth information=0. When Z depth information>0, it is submitted that, the door is open to the door frame. When the Z depth information of the target is decreased or increased with the pass of time, it is submitted that the Z depth information of the target varies.

At block 504, the analyzing module further analyzes whether the target is going to close. In at least one embodiment, when the Z depth information of the target is decreased with the pass of time, it is submitted that the target is going to close.

At block 505, the analyzing module further analyzes whether a distance between the target and a predetermined location is less than a predetermined distance or a movement speed of the target is greater than a predetermined speed. When the target is a door, the predetermined location is a door frame. The predetermined distance and the predetermined speed are the enable speed and the enable distance set at block 501. When the distance between the target and the predetermined location is less than a predetermined distance or the movement speed of the target is greater than a predetermined speed, block 506 is implemented. Otherwise, when the distance between the target and a predetermined location is greater than the predetermined distance and the movement speed of the target is less than the predetermined speed, block 502 is repeated.

At block 506, a control module determines whether a touch signal is received. In at least one embodiment, a touch sensor is installed on the target, such as on a handle of the door. The touch sensor can be used to determine whether the close of the target is intended by a user. When the touch sensor detects a touch, a touch signal can be transmitted to the control module, it can be determined that the close of the target is intended by a user, then, block 507 is implemented. Otherwise, when the touch sensor does not detect a touch, no touch signal is transmitted to the control module, it can be determined that the close of the target is not intended by a user, then the block 502 is repeated.

At block 507, the control module controls to reduce impact of the target using a predetermined method, such as, controls an actuator to actuate an impact reducing unit, and enable the impact reducing unit to provide a resistance to reduce impact generated by the target, such as, by injecting airstream.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An impact reducing device, comprising a depth-sensing camera, an impact reducing system, and an impact reducing unit, each of which connects to each other using data buses; wherein the depth-sensing camera is configured to capture images of a target and obtain Z depth information of the target;
the impact reducing system is configured to determine whether the target is within a predetermined distance to a predetermined location according to the Z depth information, and configured to control the impact reducing unit to provide a resistance in event the target is within the predetermined distance, thereby reducing any impact generated by contact with the target; and
a touch sensor installed on the target, wherein the touch sensor is used to detect a touch of a user to determine whether the close of the target is intended by the user.

2. The impact reducing device according to claim 1, wherein the impact reducing unit comprises a valve and a resistance component, and the resistance component is an airstream injection component.

3. The impact reducing device according to claim 2, further comprising an actuator which is used to actuate the impact reducing unit to open the valve, and enable the resistance component to inject airstream.

4. The impact reducing device according to claim 1, wherein the depth-sensing camera is a time-of-flight camera (TOF camera).

5. The impact reducing device according to claim 1, wherein the target is a door or a window.

6. An impact reducing method, comprising:
obtaining Z depth information of a target from a depth-sensing camera;
analyzing whether the target is within a predetermined distance to a predetermined location according to the Z depth information;

controlling an impact reducing unit to provide a resistance in event the target is within the predetermined distance, thereby reducing any impact generated by contact with the target; and providing a parameter setting interface to receive parameters set by a user, wherein the parameters comprise speed parameters and distance parameters, the speed parameters comprises an enable speed and a disable speed and the distance parameters comprises an enable distance and a disable distance, the enable speed and the enable distance are conditions of actuating the impact reducing unit, and the disable speed and the disable distance are conditions of stopping the impact reducing unit.

7. The impact reducing method according to claim 6, wherein the impact reducing unit comprises an airstream injection component to inject airstream.

8. The impact reducing method according to claim 6, wherein analyzing whether the target is going to close is by determining that whether the Z depth information of the target is decreased with the pass of time.

9. The impact reducing method according to claim 6, wherein analyzing whether the target is going to close further comprises:

analyzing whether a distance between the target and a predetermined location is less than the enable distance or a movement speed of the target is greater than the enable speed; and controlling the impact reducing unit to provide a resistance when the distance between the target and the predetermined location is less than the enable distance or the movement speed of the target is greater than the enable speed.

10. The impact reducing method according to claim 9, further comprising:

Stopping working of the impact reducing unit when the distance between the target and the predetermined location is greater than the enable distance and the movement speed of the target is less than the enable speed.

11. The impact reducing method according to claim 10, wherein the target is a door and the predetermined location is a door frame.

12. The impact reducing method according to claim 6, wherein the parameters further comprise resistance levels corresponding to movement speeds of the target.

13. The interactive communication method according to claim 12, wherein controlling an impact reducing unit to provide a resistance according to the movement speeds of the target.

14. The interactive communication method according to claim 6, further comprising:

determining whether a touch signal is received to determine whether to control the impact reducing unit to provide a resistance.

15. The interactive communication method according to claim 14, wherein the touch signal is transmitted from a touch sensor installed on the target.

* * * * *